(12) United States Patent
Weyn et al.

(10) Patent No.: US 10,944,150 B2
(45) Date of Patent: Mar. 9, 2021

(54) COMBINED ACTIVE AND PASSIVE WIRELESS COMMUNICATION DEVICE

(71) Applicants: IMEC VZW, Leuven (BE); UNIVERSITEIT ANTWERPEN, Antwerp (BE)

(72) Inventors: Maarten Weyn, Leuven (BE); Philip Ludovic E Sanders, Leuven (BE)

(73) Assignees: IMEC VZW, Leuven (BE); UNIVERSITEIT ANTWERPEN, Antwerp (BE)

(*) Notice: Subject to any disclaimer, the term of this patent is extended or adjusted under 35 U.S.C. 154(b) by 0 days.

(21) Appl. No.: 16/603,344

(22) PCT Filed: Mar. 23, 2018

(86) PCT No.: PCT/EP2018/057425
§ 371 (c)(1),
(2) Date: Oct. 7, 2019

(87) PCT Pub. No.: WO2018/184866
PCT Pub. Date: Oct. 11, 2018

(65) Prior Publication Data
US 2020/0052371 A1    Feb. 13, 2020

(30) Foreign Application Priority Data
Apr. 7, 2017 (EP) ..................... 17165400

(51) Int. Cl.
*H01Q 1/22* (2006.01)
*H02J 50/20* (2016.01)
(Continued)

(52) U.S. Cl.
CPC ........... *H01Q 1/2225* (2013.01); *H01Q 21/28* (2013.01); *H02J 50/20* (2016.02); *H04B 5/0031* (2013.01);
(Continued)

(58) Field of Classification Search
CPC ....... H01Q 1/2225; H01Q 21/28; H02J 50/20; H04B 5/0031; H04B 5/0037; H04B 5/0062
(Continued)

(56) References Cited

U.S. PATENT DOCUMENTS 7,304,578 B1 * 12/2007 Sayers ............... G06K 19/0716
340/572.1
8,344,853 B1 * 1/2013 Warner ............ G06K 19/07309
340/10.1
(Continued)

FOREIGN PATENT DOCUMENTS

| EP | 2573948 A1 | 3/2013 |
| EP | 2811789 A1 | 12/2014 |
| WO | 2007133690 A2 | 11/2007 |

OTHER PUBLICATIONS

European Search Report from EP Application No. EP17165400, dated Jun. 22, 2017.
(Continued)

*Primary Examiner* — Eric Blount
(74) *Attorney, Agent, or Firm* — Workman Nydegger

(57) ABSTRACT

A wireless communication device comprises a control unit, an antenna interface, an active wireless transceiver operable together with the control unit and antenna interface, a passive wireless transceiver operable together with the antenna interface and operable by harvesting power from received radio messages. The device is further configured to deactivate the one or more active wireless transceivers and control unit to an inactive state and, subsequently, by the passive wireless transceiver, activate the control unit and an active wireless transceiver to an active state when the passive wireless transceiver receives a message from the antenna interface.

14 Claims, 3 Drawing Sheets

(51) Int. Cl.
*H01Q 21/28* (2006.01)
*H04B 5/00* (2006.01)

(52) U.S. Cl.
CPC ......... *H04B 5/0037* (2013.01); *H04B 5/0062* (2013.01)

(58) Field of Classification Search
USPC .................................. 340/572.1–572.8, 10.1
See application file for complete search history.

(56) References Cited

U.S. PATENT DOCUMENTS

| | | | | |
|---|---|---|---|---|
| 8,384,523 B1* | 2/2013 | Rodriquez | ............... | H04Q 9/00 340/10.1 |
| 8,410,906 B1* | 4/2013 | Dacus | ................ | G06K 19/0701 340/10.1 |
| 9,367,711 B1* | 6/2016 | Dacus | .................. | G06K 7/0008 |
| 2005/0093374 A1* | 5/2005 | Connors | ............ | G06K 19/0723 307/126 |
| 2006/0030353 A1* | 2/2006 | Jun | ....................... | H04B 1/1615 455/550.1 |
| 2006/0280149 A1* | 12/2006 | Kuhl | .................... | H04B 5/0062 370/338 |
| 2007/0159338 A1* | 7/2007 | Beber | ................ | G06K 19/0717 340/572.8 |
| 2008/0150698 A1* | 6/2008 | Smith | .................... | H04W 88/06 340/10.4 |
| 2010/0238002 A1* | 9/2010 | Ryan | ....................... | H04Q 9/00 340/10.52 |
| 2011/0163850 A1* | 7/2011 | Bachman | ............ | G06K 19/0702 340/10.1 |
| 2011/0187544 A1* | 8/2011 | Ross | ....................... | G08C 17/02 340/636.2 |
| 2016/0379024 A1* | 12/2016 | Tippery | ............. | G06K 19/0723 340/10.1 |

OTHER PUBLICATIONS

International Search Report & Written Opinion from PCT Application No. PCT/EP2018/057425, dated May 16, 2018.

* cited by examiner

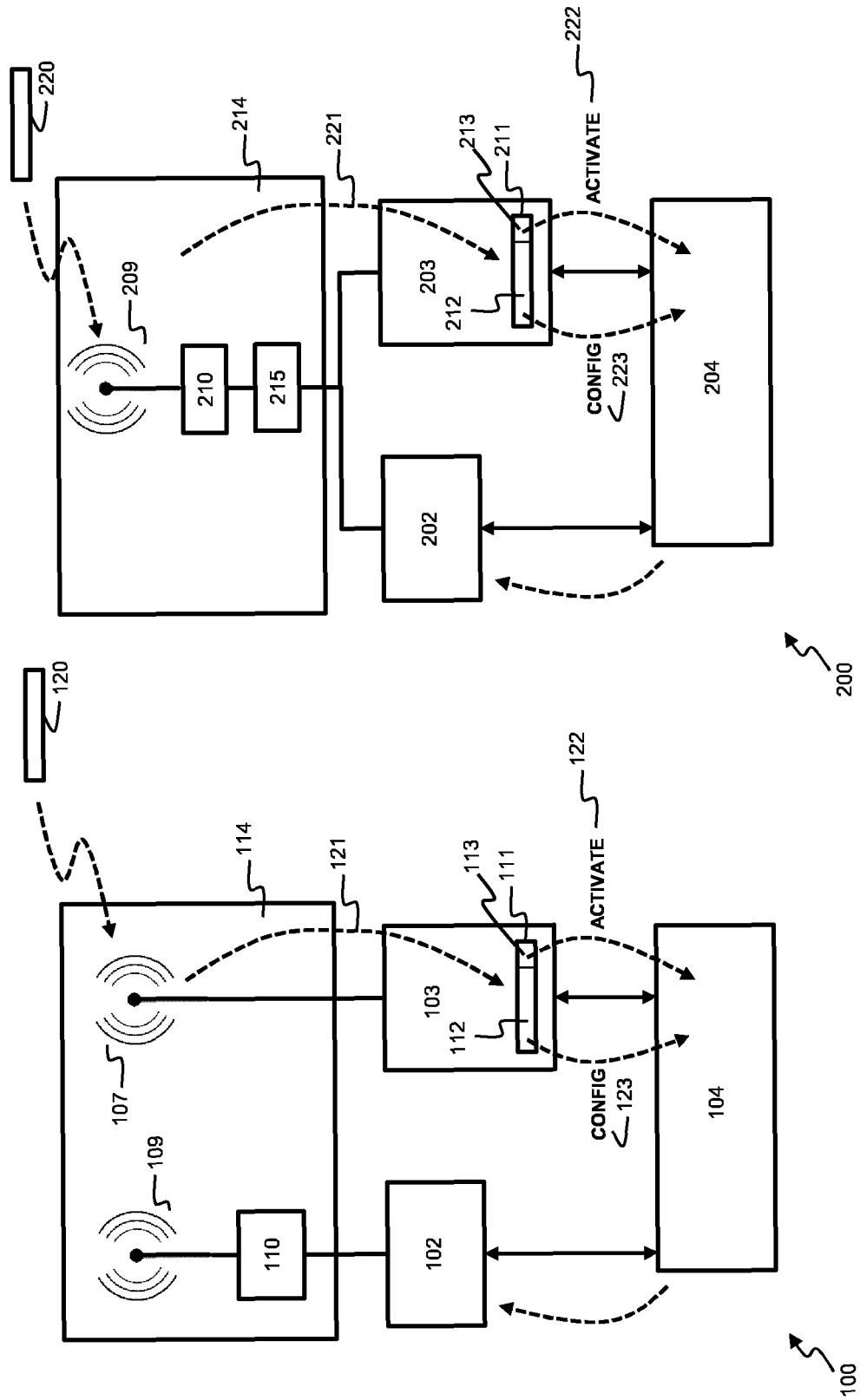

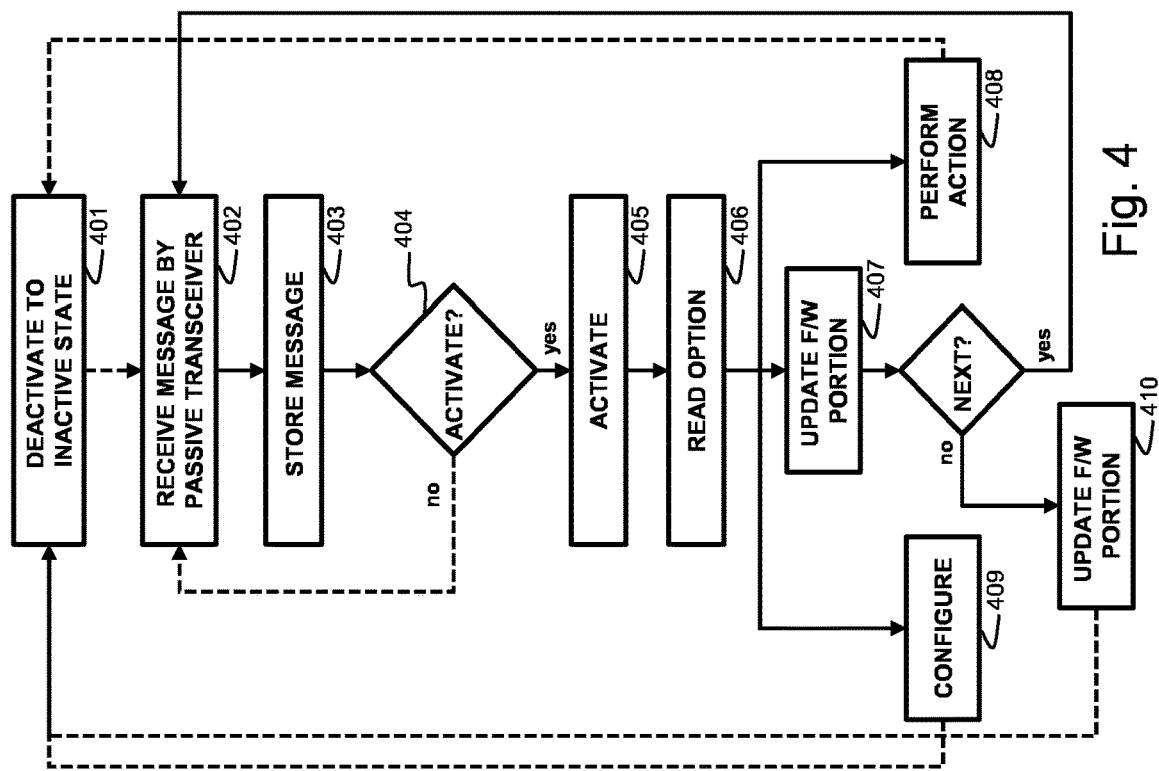
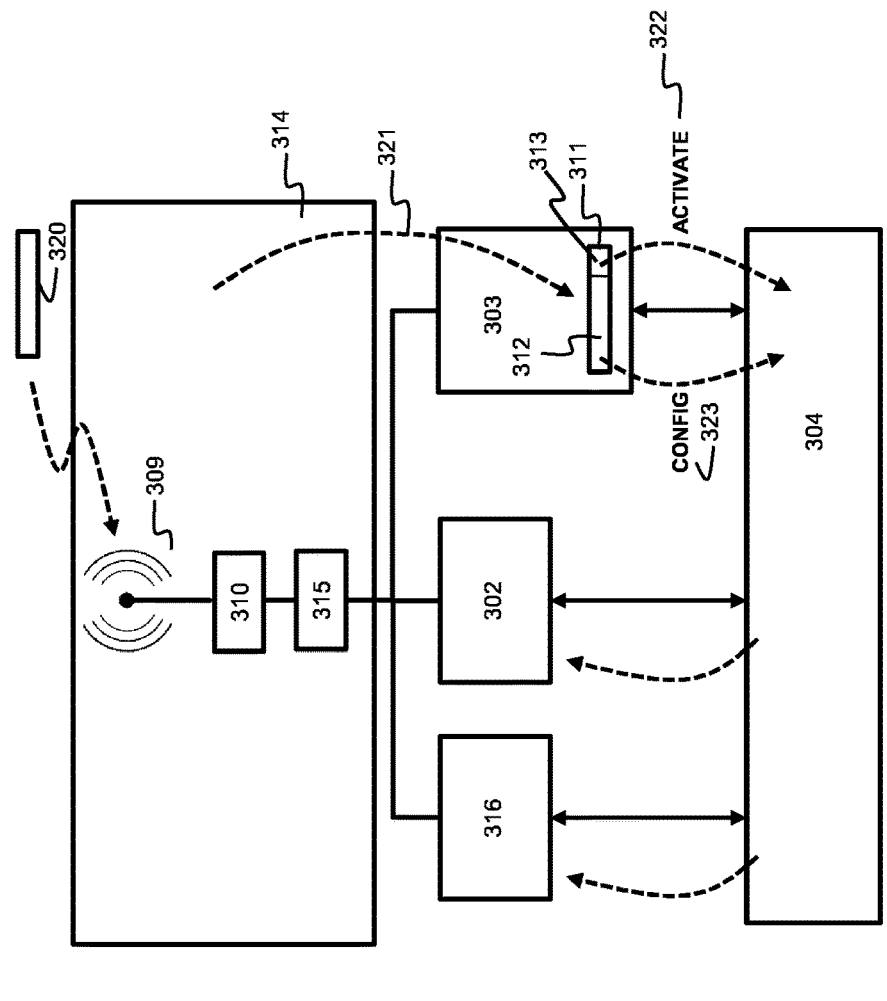

COMBINED ACTIVE AND PASSIVE WIRELESS COMMUNICATION DEVICE

FIELD OF THE INVENTION

The present invention generally relates to a wireless communication device that comprises both an active and passive wireless transceiver.

BACKGROUND OF THE INVENTION

The Internet of things (IoT) is a driving factor for the miniaturization of low power wireless communication devices. While the devices are shrinking in size, they must remain operational for a long time on a single battery charge. In order to achieve this, different low power wireless standards have been proposed. These standards focus on low power operation rather than on achieving high throughputs or continuous connectivity.

One group of low power wireless standards, are the so called passive wireless standards. The best known example is probably the passive RFID tag (radio-frequency identification tag). When the tag receives an electromagnetic signal from an RFID reader, it will harvest the energy from the electromagnetic signal and it will use this energy for sending a response signal to the RFID reader. There is thus no need for an internal power supply in order to operate the passive RFID tag and, therefore, it is referred as passive. There are a plurality of different RFID standards depending on the region and application. One example is the EPC or UHF Gen 2 protocol which is short for EPCglobal UHF Class 1 Generation 2 and adopted by the International Standards Organisation (ISO) under ISO 18000-6C. The UHF Gen 2 protocol operates in the popular Ultra High Frequency (UHF) band between 860 and 960 MHz.

The other group of low power wireless standards comprise the active wireless standards, which require an energy source in the wireless device to operate. One subgroup is targeted towards the formation of Low Power Wireless Area Networks (LPWAN) and covers different standards such as for example LoRa(WAN), SigFox, LTE-MTC etc. Another subgroup is targeted to radio frequency identification of wireless devices, i.e., the active counterpart of the passive RFID standards. Active RFID allows achieving a larger range and higher throughputs at the cost of the necessity for an internal power source.

As the different standards with their different technologies serve different applications, there is a need for wireless devices that integrate several of the wireless technologies while preserving a low power consumption.

For example, in WO2007133690 a multiple antenna design for different RFID frequencies is disclosed combining both passive and semi-active RFID elements. It further discloses to enhance the passive RFID element by using the battery of the semi-active RFID element. A problem with this solution is that the battery consumption is increased by the combination for the sake of better reception.

In US2010238002 a control function for switching between an active and passive RFID transponder is disclosed. For the switching between the modes, a microprocessor can operate in both a passive and active mode and is used to exchange information between the operating modes. A problem of this solution is that the functionality is limited to RFID. Supporting other standards that are more computational intensive is not possible because the microprocessor must be able to operate in a passive mode.

SUMMARY OF THE INVENTION

It is an object of the present invention to overcome, according to different aspects and embodiments, the above identified shortcomings and problems. It is a further object to provide a wireless device that supports both passive and active wireless standards including standards that support LPWAN while maintaining the possibility to operate in a pure passive mode.

This object is achieved, according to a first aspect, by a wireless communication device comprising:
  a control unit; and
  an antenna interface; and
  one or more active wireless transceivers operable together with the control unit and antenna interface; and
  a passive wireless transceiver operable together with the antenna interface and operable by harvesting power from received radio messages;
The device is then further configured to:
  deactivate the one or more active wireless transceivers and control unit to an inactive state; and
  subsequently, by the passive wireless transceiver, activate the control unit and at least one of the active wireless transceivers to an active state when the passive wireless transceiver receives a message from the antenna interface.

In other words, the device is operable according to a passive wireless standard by the combination of the passive wireless transceiver and the antenna interface. By this combination the device may for example operate as a passive RFID tag wherein it receives a message from an RFID reader and, thereupon, broadcasts an identifier to the reader. Furthermore, the device is also operable according to an active wireless standard which may be an active RFID standard and/or LPWAN standard. The operation according to an active wireless standard is performed by a combination of the antenna interface, an active wireless transceiver and the control unit.

When operating according to the passive standard, the active wireless transceiver(s) and control unit are inactive. Inactive should be understood as the inability to send or receive data according to the supported active standards or, specifically for the control unit, the inability to perform any software instruction. Preferable, inactive should be further understood as not being supplied of any power by, for example, a battery.

When the passive transceiver receives a certain message, this message will bootstrap the wireless device and activate both the control unit and one of the active wireless transceivers. It is thus an advantage that the device can operate as a passive wireless device when other components are inactive and, thus, consume no power. When needed, i.e., at any preferred moment, the device can be switched to an active wireless device by sending a predetermined message to the wireless device. It is a further advantage that the device can operate according to a LPWAN standard without the need for remaining in an active state or for periodically waking up, for example to transmit a beacon message. This way, the advantage of operating according to a LPWAN standard for the exchange of information can be combined with a powerless sleep mode, i.e., no internal power source is needed to wake up the device because the device can be activated externally at any preferred moment. Moreover, as the control unit is only required for the active mode, there is no real restriction on the control unit by the passive transceiver because it does need to power the control unit.

According to an embodiment, the passive wireless transceiver comprises a memory for storing received messages. Such memory is preferably a non-volatile memory such that a stored message remains in the memory when the passive transceiver is unpowered.

Also this memory is then passively powered, i.e., powered from energy harvested from received radio signals, more specifically from the energy in the communication signals that carry the received message.

In this a case, according to a further embodiment the passive wireless transceiver is further configured to:
activate the control unit upon storing one or more bits of the received message into the memory.

The memory in the passive transceiver is thus used as activator of the control unit, i.e., when writing into the memory, a control signal is sent to the control unit to wake it up from the inactive state. This waking up may for example be performed by enabling the power supply to the control unit. This has the advantage that an existing passive transceiver can be used for constructing a device according to the invention because most passive wireless transceivers have such a memory.

The activation of the control unit may be done upon writing into one specific location of the memory irrespective of the content of the message.

Alternatively, the activation may be done by writing a specific value into a specific location of the memory wherein the value may be one or more predetermined logical combinations of bits. This way, not every message will wake up the control unit, but only messages comprising the one or more predetermined logical combination of bits. This has the further advantage that the device may appear as a passive-only device to readers that do not have (or know) the specific message for waking up the control unit.

According to a further embodiment the received message comprises a configuration field and the control unit is further configured to:
upon activation, read the configuration field from the memory; and
configure the device according to the configuration field.

This has the advantage that the device can be configured from the passive mode depending of the respective message that is sent to the passive transceiver. The device may then be setup differently depending on the use case. The configuration may for example comprise: the active transceiver that is to be activated, the used frequency band, the wireless protocol to be used, etc.

Alternatively or complementary, the received message encodes an action in an action field and the control unit is further configured to:
upon activation, read the action field from the memory; and
perform the action.

An action or instruction is to be understood as a command that is to be executed by the device. Such a command may for example be performed after the configuration of the device. This thus allows sending instructions to the device in a passive mode, i.e., the device is not required to be in an active mode for receiving the instructions.

Upon the configuring, the control unit may further be configured to:
upon the configuring, repeatedly receive messages wherein each message comprises a portion of a software program product; and
storing each portion of the software program product into a memory of the device; and
configuring the device to use the software program product.

In other words, the device can be reprogrammed with a new software program product, i.e., updated with new firmware, by only using the passive wireless transceiver. There is thus no need to activate the active transceiver to update the software of the device. The greatly reduces the power consumption of the update process because no active communication is required.

The antenna interface of the device is capable of transforming RF signals to signals that can be used by the active or passive transceiver. Such signal may for example correspond to intermediate frequency signals or baseband signals in an analogue or digital format. Components in the antenna interface may be shared between the different transceivers depending on specific embodiments of the invention.

According to a first embodiment, the antenna interface further comprises:
a first RF front-end interface coupled to the passive wireless transceiver; and
a second RF front-end interface coupled to the at least one active wireless transceiver.

In other words, the passive and active transceivers are connected to different front-ends and thus to different antenna's. This has the advantage that the device can be implemented using existing off the shelf components.

According to a second embodiment, the antenna interface further comprises:
an RF front-end interface; and
a switch for coupling the RF front-end interface to the at least one of the active wireless transceivers or to the passive wireless transceiver;
and wherein the switch is configured to couple the front-end to the passive wireless transceiver when the one or more active wireless transceivers and control unit are in the inactive state; and wherein the switch is configured to couple the front-end to the at least one of the active wireless transceivers when the at least one of the active wireless transceivers and control unit are in the active state.

In this case, an active and passive transceiver share the same RF front-end and thus also the same antenna. Both transceivers can thus not be used at the same. However, this has the advantage that the device can be made smaller and with less components because antenna's typically take up a large area in small wireless devices.

Advantageously, the switch is further configured to couple the RF front-end interface to the passive wireless transceiver when there is no power supplied to the switch.

This way, the device can still operate completely powerless in passive mode despite the use of an active switch.

According to a third embodiment, the antenna interface further comprises:
an RF front-end interface coupled to the at least one of the active wireless transceivers; and
an attenuator coupling the RF front-end interface to the passive wireless transceiver.

In this case, there is only one antenna and front-end, but the signal power is divided between the active transceiver(s) and the passive transceiver. This has the advantage that a single front-end can be used without the need for a switch.

According to a second aspect, the invention relates to a computer-implemented method for managing a wireless communication device; the wireless communication device comprising: a control unit, an antenna interface, one or more active wireless transceivers operable together with the control unit and antenna interface, a passive wireless transceiver operable together with the antenna interface and operable by harvesting power from received messages; and wherein the device is further configured to:

deactivate the one or more active wireless transceivers and control unit to an inactive state; and subsequently, by the passive wireless transceiver, activate at least one of the active wireless transceivers and control unit to an active state when the passive wireless transceiver receives a message from the antenna interface and stores the message in a memory;

and wherein the method comprises the following steps performed by the control unit:

upon activation, reading a configuration field of the message from the memory; and configuring the device according to the configuration field.

According to a third aspect, the invention relates to a computer program product comprising computer-executable instructions for performing the method according to the second aspect when the program is run on a computer.

According to a fourth aspect, the invention relates to a computer readable storage medium comprising the computer program product according to the third aspect.

BRIEF DESCRIPTION OF THE DRAWINGS

FIG. 1 illustrates a wireless communication device according to an embodiment of the invention; and FIG. 2 illustrates a wireless communication device according to an embodiment of the invention; and FIG. 3 illustrates a wireless communication device according to an embodiment of the invention; and FIG. 4 illustrates steps performed by the wireless communication device according to embodiments of the invention.

DETAILED DESCRIPTION OF EMBODIMENT(S)

Figure 5:
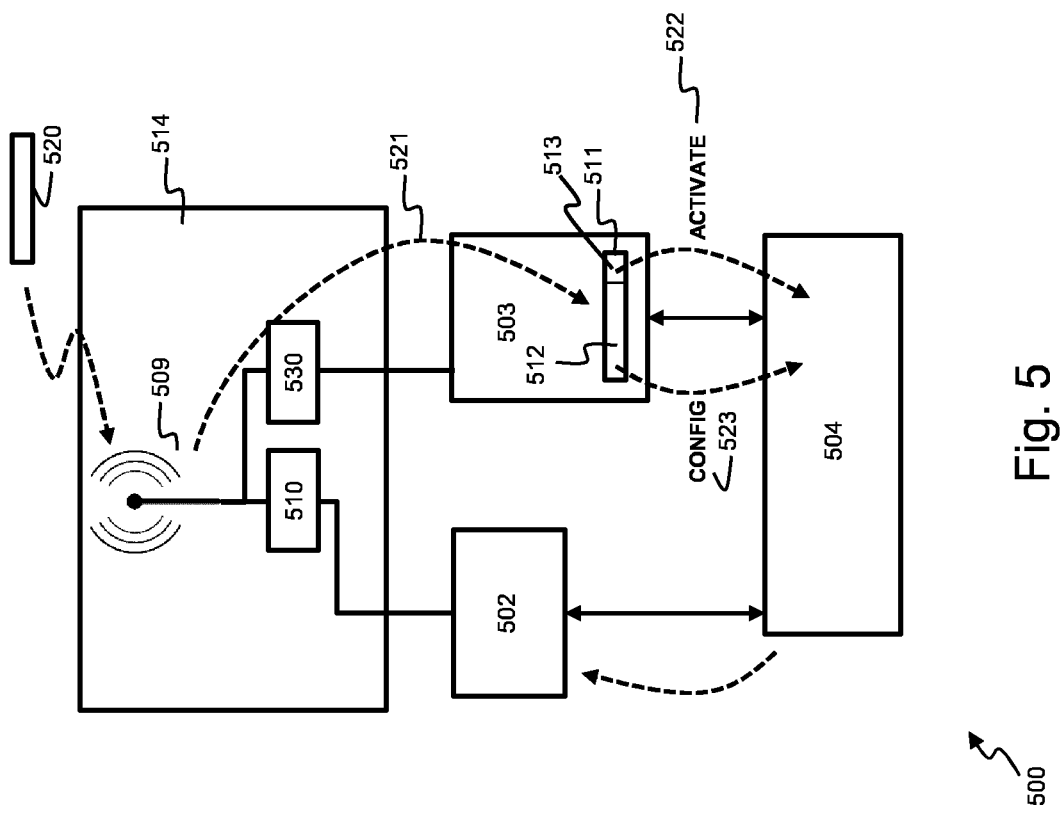
FIG. 5 illustrates a wireless communication device according to an embodiment of the invention.

FIG. 1 illustrates a wireless communication device 100 according to an embodiment of the invention. Device 100 comprises an antenna interface 114, an active wireless transceiver 102, a passive wireless transceiver 103 and control unit 104.

The antenna interface comprises a first antenna interface 109-110 or front-end coupled with the active wireless transceiver 102. The first antenna interface comprises an antenna 109 and balun 110 to provide the conversion between the unbalanced signal at the antenna interface and the balanced signal at the active transceiver 102. Active transceiver 102 is a chipset providing baseband functions for one or more active wireless standards, i.e., wireless standards that require an energy source in the wireless device to be operable. Preferably the active transceiver supports an active RFID standard and/or a Low Power Wireless Area Network (LP-WAN) standard, e.g., LoRa(WAN), SigFox, LTE-MTC. Active transceiver 102 is further coupled to control unit 104, for example a general purpose processor capable of performing instructions of a computer program product. Control unit may be configured to execute a network stack implemented in software. This way antenna interface 114, active transceiver 102 and control unit 104 allow device 100 to operate according to the active wireless standard(s) supported by transceiver 102.

The antenna interface further comprises a second antenna 107 coupled to the passive wireless transceiver 103. Passive transceiver 103 is a chipset providing baseband and RF functions for one or more passive wireless standards, i.e., wireless standards that do not rely on the power supply (not shown in figure) of device 100. Passive transceiver is therefore equipped to harvest energy from signals 120 received at antenna 107. Preferably, the passive transceiver implements a passive RFID standard, i.e., acts as a radio-frequency identification tag, such that the device 100 functions as a passive RFID tag. When the antenna 107 receives an electromagnetic signal 120 from an RFID reader (not shown in figure), it will harvest the energy from the electromagnetic signal and use it for sending a response signal to the RFID reader. There is thus no need for use of the internal power supply of device 100 in order to operate as a passive RFID tag. Antenna 107 and transceiver 103 may support different RFID standards depending on the region and application. One example is the EPC or UHF Gen 2 standard which is short for EPCglobal UHF Class 1 Generation 2 and adopted by the International Standards Organisation (ISO) under ISO 18000-6C. The UHF Gen 2 standard operates at Ultra High Frequencies (UHF) between 860 and 960 MHz. Passive transceiver 103 further comprises a register 111 into which bits comprised in a received message 120 can be stored in a passive way. Register 111 is a non-volatile memory such that bits written in register 111 are permanently stored. Control unit 104 is further configured to communicate with passive transceiver 103 and to read and/or write from/to register 111.

Control unit 104, active transceiver 102 and, if applicable, first antenna interface 109-110 are further configured to operate in an active and inactive state or mode. In an active state, power is supplied to the respective component such that it is operable. In an inactive state, the respective component is not operable, i.e., it is not operable, and, preferable, the component does not consume any power at all. This way, device 100 can be operated in a completely passive mode when control unit 104 and active transceiver 102 are in the inactive state. When in passive mode, device 100 functions according to the passive wireless standard and may receive and send messages 120 over antenna 107 and the passive transceiver 103.

The register 111 is further coupled to the control unit 104 such that, upon writing one or more bits 113 into register 111, the control unit 104 is turned from the inactive state to the active state. This may be done when one or more predefined logical combinations of bits are written into the register by passive transceiver 103. This may also be done when one or more bits 113 in register 111 are overwritten, irrespective of the values. Passive transceiver 103 is thus configured to turn the control unit 104 from the inactive state to the active state or, in other words, to activate the control unit 104.

FIG. 2 illustrates a wireless communication device 200 according to a second embodiment of the invention. Device 200 comprises an active transceiver 202, passive transceiver 203 with register 211 and control unit 204 that may be same as respective transceiver 102, passive transceiver 103 with register 111 and control unit 104. Device 200 differs from device 100 in its antenna interface 214. Antenna interface 214 comprises a single antenna 209 for receiving and sending messages 220 according to both the active and passive wireless standards, i.e., antenna interface 214 thus comprises a single front-end. Antenna 209 is coupled to balun 210 and the balun 210 is further coupled to the switch 215. The switch allows to connect antenna interface 214 either to active transceiver 202 or to passive transceiver 203. The switch 215 is further operable by control unit 204. Preferably, switch 215 is by default connecting balun 210 with passive transceiver 203. This way, when device 200 is unpowered, it always operates in the passive mode.

FIG. 3 illustrates a wireless communication device 300 according to a third embodiment of the invention. Device 300 comprises an antenna interface 314, a first active wireless transceiver 302, a second active wireless transceiver 316, a passive wireless transceiver 303 further comprising a register 311 and a control unit 304. Both the first and second active wireless transceiver 302 and 316 may be the same as the active transceivers 102 or 202. For example, the first transceiver 302 may support an active RFID standard and the second transceiver may support an LPWAN standard. Passive wireless transceiver 303 may be the same as passive wireless transceivers 103 and 203 and be connected or coupled in the same way with antenna interface 314 and control unit 304. Antenna interface 314 further comprises an antenna 309 and a balun 310, thereby forming a front-end, and a switch 315. Antenna 309 and balun 310 may be the same as antenna 209 and balun 210. The switch 315 operates in a similar way as switch 215 with the exception that switch 315 can connect the front end to the three transceivers 303, 302 and 316. Switch 315 is preferably operated by control unit 304 such that control unit can configure device 300 to operate according to any of the supported standards, either passive or active. Preferably, also switch 315 is connecting the balun 315 with the passive transceiver 303 by default or when it is unpowered.

FIG. 5 illustrates a wireless communication device 500 according to a fourth embodiment of the invention. Device 500 comprises an antenna interface 514, a first active wireless transceiver 502, a passive wireless transceiver 503 further comprising a register 511 and a control unit 504. Transceiver 502 may be the same as the active transceivers 102, 202, 302 and 316 and, for example, support an active RFID standard and/or an LPWAN standard. Passive wireless transceiver 503 may be the same as passive wireless transceivers 103, 203 and 303 and be connected in the same way with antenna interface 514 and control unit 504. Antenna interface 514 further comprises an antenna 509, a balun 510 and an attenuator 530. Antenna 509 and balun 510 may be the same as antenna 209 or 309 and balun 210 or 310. The attenuator connects the antenna 509 to the passive wireless transceiver 503 in an uninterruptable fashion. When a message 520 is received at antenna 509, a first portion of the signal will be directed to the active transceiver 502 and an attenuated portion of the same signal will be directed to the passive wireless transceiver 503. This way, a switching component like in FIG. 2 and FIG. 3 is avoided while maintaining the advantage of a single antenna 509.

FIG. 4 illustrates steps of a method performed by the devices 100, 200, 300 and 500 according to an embodiment of the invention. In the description of FIG. 4 below, reference will be made to the respective devices 100, 200, 300 and 500.

The method starts at step 401 wherein the device is deactivated into an inactive state, i.e., control unit 104, 204, 304, 504 and the active wireless transceivers 102, 202, 302, 316, 504 are turned into an inactive state. In this inactive state, the active transceivers are preferable disconnected from a power supply such as a battery arranged in the device. This disconnection may for example be done by a switch. The step 401 may be executed by the control unit 104, 204, 304 or 504, i.e. step 401 is invoked by an instruction executed on the control unit. This instruction may further operate switch 315 or 215 to connect the antenna 309 or 209 to the passive wireless transceiver 303 or 203. If the switch is a passive switch, it suffices to disconnect the switch from the power supply such that the switch switches to its default state in which it connects the antenna to the passive transceiver. After execution of step 401, the device is in passive mode, i.e., it operates according to the passive wireless standard and is able to send and receive messages at the passive transceiver.

At a certain moment in time, the device will receive a message 120, 220, 320, 520 at the antenna interface 114, 214, 314, 514, e.g., from an RFID reader. This message will power the passive transceiver 103, 203, 303, 503 upon which the message will be demodulated and stored in the subsequent step 403 in register 111, 211, 311, 511. This is illustrated by arrow 121, 221, 321, 521.

It is then decided in step 404 whether the control unit 104, 204, 304, 504 should be activated. If one or more bits 313 in register 311 are written or if the one or more bits 313 match a predefined logical combination, then the passive transceiver 103, 203, 303. 503 activates the control unit in step 405. This is illustrated by arrow 122, 222, 322, 522. If the message does not comprise the correct value for activating the device, the control unit is not activated and the device remains in the passive mode. In the passive mode, the passive transceiver may further transmit a message to the reader in response to the received message 120, 220, 320, 520 whereupon it is ready to receive the next message in step 402.

Upon activation of the control unit, the control unit reads the next instruction that has to be performed. Preferably, this instruction is also encoded in a field of the received message 120, 220, 320, 520 and is thus available in a memory location 112, 212, 312, 512 of register 111, 211, 311, 511. In step 406, the control unit reads this field from the register. Depending on the value in the field, the control unit may then perform different actions. FIG. 4 illustrates three possible actions 409, 410 and 408 according to different embodiments.

According to a first possibility, the field encodes a configuration of the device in the active mode. The reading of the configuration field is further illustrated by arrows 123, 223, 323, 523. According to this configuration field, the control unit configures the device to the active mode in step 409. This configuring may for example comprise the following sub-steps:

Activate the active wireless transceiver 102, 202, 302, 316, 502. The configuration field may further specify which of the transceivers 302 or 316 has to be activated.

Set the switch 215, 315 to connect the antenna interface 214, 314 to the correct active transceiver.

Configure the active wireless transceiver, e.g., bandwidth, modulation, coding rate . . . .

According to a second possibility, the field 112, 212, 312, 512 indicates that a new firmware is available for the device, i.e., a software program product for the control unit or for one of the active transceivers. The field may further comprise the complete software program product or a first portion of the software program product. In the last case, the control unit returns to step 401 in order to receive a next message 120, 220, 320, 520. Optionally, the control unit may remain in the active mode as it will anyhow be activated upon reception of the next portion. Subsequently, the device receives the next portion of the software program product by reading the field 112, 212, 312, 512 of the next received message. These steps 402, 403, 404, 405, 405, 407 are repeated until all portions of the software program product are received upon which the device proceeds to step 410 wherein the firmware of the respective control unit is updated. After the updating, the control unit may remain in active mode or return back to the passive mode under step 401.

According to a third possibility, the field 112, 212, 312, 512 indicates that a certain action that is to be performed, e.g., the field may comprise a piece of code that is to be executed by the control unit. In this case, the control unit proceeds to step 408 and executes the piece of code. The action to be performed may comprise the transmission of the message by the device by one of the active wireless standards, e.g., the transmission of a sensor reading from a sensor arranged in the wireless device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A wireless communication device comprising:
    a control unit;
    an antenna interface;
    one or more active wireless transceivers operable together with the control unit and the antenna interface; and
    a passive wireless transceiver operable together with the antenna interface and operable by harvesting power from received radio messages; and
    wherein the device is configured to
        deactivate the one or more active wireless transceivers and the control unit to an inactive state; and
        subsequently, by the passive wireless transceiver, activate the control unit and at least one of the active wireless transceivers to an active state when the passive wireless transceiver receives a message from the antenna interface; and
    wherein the antenna interface further comprises:
        an RF front-end interface; and
        a switch for coupling the RF front-end interface to the at least one of the active wireless transceivers or to the passive wireless transceiver;
    wherein the switch is configured to couple the RF front-end interface to the passive wireless transceiver when the one or more active wireless transceivers and control unit are in the inactive state; and
    wherein the switch is configured to couple the RF front-end interface to the at least one of the active wireless transceivers when the at least one of the active wireless transceivers and control unit are in the active state.

2. The wireless communication device according to claim 1, wherein, in the inactive state, the one or more active wireless transceivers are unable to send and receive data.

3. The wireless communication device according to claim 1, wherein the passive wireless transceiver and the antenna interface form a passive RFID tag.

4. The wireless communication device according to claim 1, wherein the at least one of the active wireless transceivers, the antenna interface and the control unit form an active RFID tag.

5. The wireless communication device according to claim 1, wherein the passive wireless transceiver comprises a memory for storing received messages.

6. The wireless communication device according to claim 5, wherein the passive wireless transceiver is further configured to:
    activate the control unit upon storing one or more bits of the received message into the memory.

7. The wireless communication device according to claim 5, wherein the received message comprises a configuration field; and
    wherein the control unit is further configured to:
        upon activation, read the configuration field from the memory; and
        configure the device according to the configuration field.

8. The wireless communication device according to claim 5, wherein the received message encodes an action in an action field; and
    wherein the control unit is further configured to:
        upon activation, read the action field from the memory; and
        perform the action.

9. The wireless communication device according to claim 8, wherein the control unit is further configured to:
    upon the configuring, repeatedly receive messages wherein each message comprises a portion of a software program product;
    store each portion of the software program product into the memory of the device; and
    configure the device to use the software program product.

10. The wireless communication device according to claim 1, wherein the antenna interface further comprises:
    the first RF front-end interface coupled to the passive wireless transceiver; and
    a second RF front-end interface coupled to the at least one active wireless transceiver.

11. The wireless communication device according to claim 1, wherein the switch is configured to couple the RF front-end interface to the passive wireless transceiver when there is no power supplied to the switch.

12. A computer-implemented method for managing a wireless communication device, the wireless communication device including a control unit, an antenna interface, one or more active wireless transceivers operable together with the control unit and the antenna interface, a passive wireless transceiver operable together with the antenna interface and operable by harvesting power from received messages, and an RF front-end interface, and a switch for coupling the RF front-end interface to the at least one of the active wireless transceivers or to the passive wireless transceiver, wherein the device is configured to deactivate the one or more active wireless transceivers and the control unit to an inactive state, and the device is further configured to subsequently, by the passive wireless transceiver, activate at least one of the active wireless transceivers and control unit to an active state when the passive wireless transceiver receives a message from the antenna interface and stores the message in a memory, wherein the switch is configured to couple the RF front-end interface to the passive wireless transceiver when the one or more active wireless transceivers and control unit are in the inactive state, and wherein the switch is configured to couple the RF front-end interface to the at least one of the active wireless transceivers when the at least one of the active wireless transceivers and control unit are in the active state;

wherein the method comprises the following steps performed by the control unit:

upon activation, reading a configuration field of the message from the memory;

configuring the device according to the configuration field.

13. A non-transitory computer program product comprising computer-executable instructions for performing the method according to claim 12 when the program is run on a computer.

14. A non-transitory computer-readable storage medium having stored thereon executable instructions, which, when executed by one or more processors of a computer system, configure the computer system to manage a wireless communication device, the wireless communication device including a control unit, an antenna interface, one or more active wireless transceivers operable together with the control unit and the antenna interface, a passive wireless transceiver operable together with the antenna interface and operable by harvesting power from received messages, an RF front-end interface, and a switch for coupling the RF front-end interface to the at least one of the active wireless transceivers or to the passive wireless transceiver, wherein the device is configured to deactivate the one or more active wireless transceivers and the control unit to an inactive state and the device is further configured to subsequently, by the passive wireless transceiver, activate at least one of the active wireless transceivers and control unit to an active state when the passive wireless transceiver receives a message from the antenna interface and stores the message in a memory, wherein the switch is configured to couple the RF front-end interface to the passive wireless transceiver when the one or more active wireless transceivers and control unit are in the inactive state, and wherein the switch is configured to couple the RF front-end interface to the at least one of the active wireless transceivers when the at least one of the active wireless transceivers and control unit are in the active state;

wherein the managing of the wireless communication device comprises the following steps performed by the control unit:

upon activation, reading a configuration field of the message from the memory; and configuring the device according to the configuration field.

* * * * *